Figure 5:
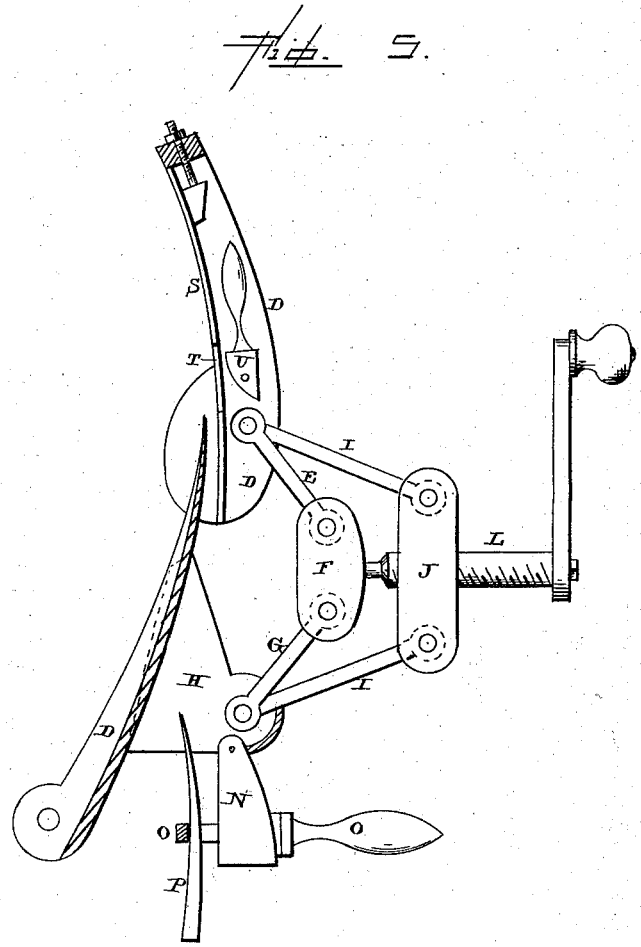

(No Model.) 2 Sheets—Sheet 1.
W. M. PALMER.
TIRE UPSETTER.
No. 384,778. Patented June 19, 1888.
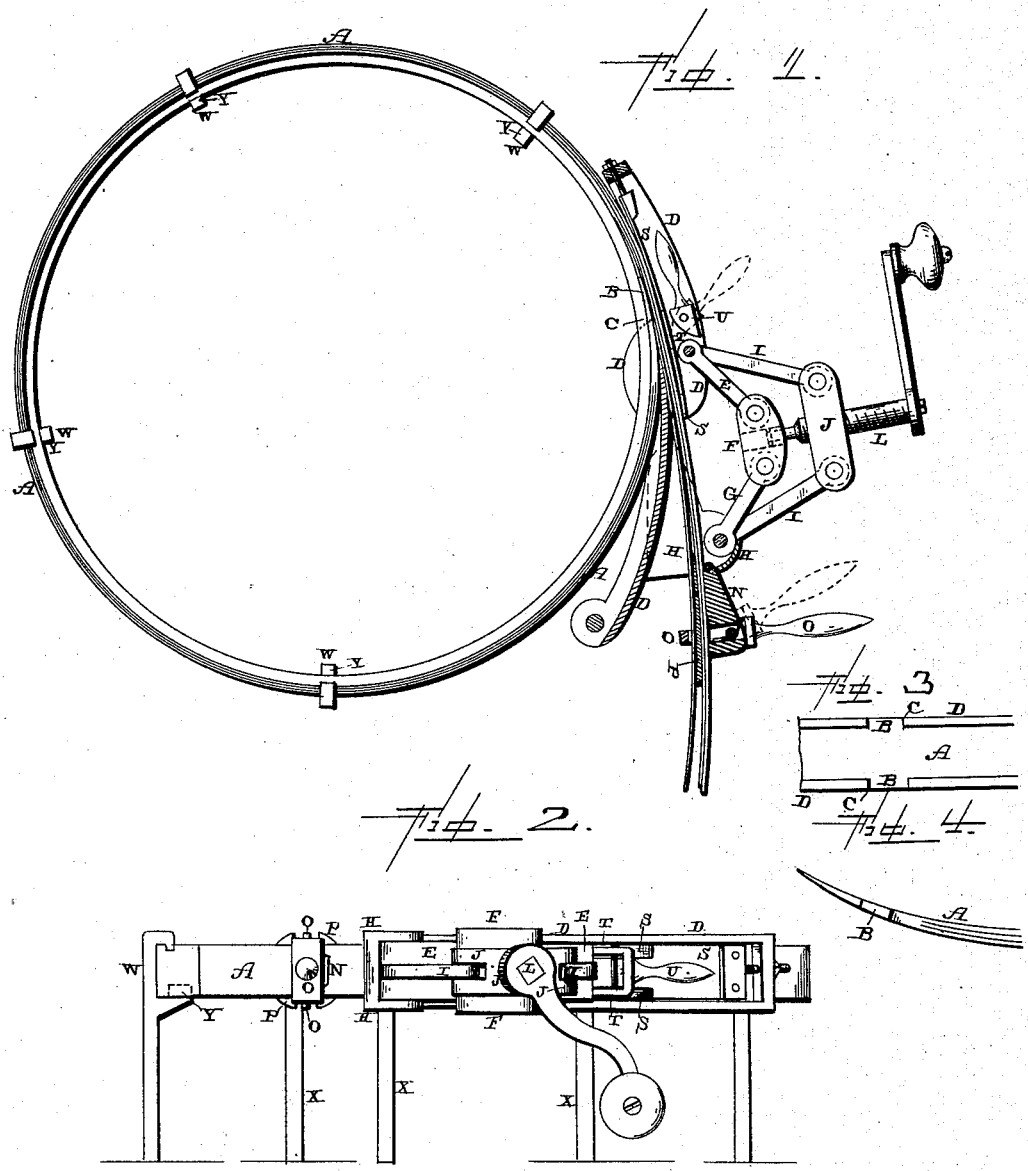

(No Model.) 2 Sheets—Sheet 2.

W. M. PALMER.
TIRE UPSETTER.

No. 384,778. Patented June 19, 1888.

UNITED STATES PATENT OFFICE.

WILLIAM M. PALMER, OF MIDDLETOWN, NEW YORK.

TIRE-UPSETTER.

SPECIFICATION forming part of Letters Patent No. 384,778, dated June 19, 1888.

Application filed April 24, 1888. Serial No. 271,716. (No model.)

*To all whom it may concern:*

Be it known that I, WILLIAM M. PALMER, of Middletown, in the county of Orange and State of New York, have invented certain new and useful Improvements in Tire-Upsetters; and I do hereby declare the following to be a full, clear, and exact description of the invention, such as will enable others skilled in the art to which it pertains to make and use it, reference being had to the accompanying drawings, which form part of this specification.

My invention relates to an improvement in tire-upsetters; and the object of my invention is to provide a machine by which the tire can be shrunk while upon the wheel, and thus dispense with all necessity of having to remove the tire.

Figure 1 is a plan view of a machine which embodies my invention, partly in section. Fig. 2 is a side elevation of the same. Figs. 3 and 4 are detached views of the inner end of the flexible band and a portion of the clamp D. Fig. 5 is an enlarged detached view in section of the two clamps.

A represents three flexible bands which are rigidly secured together at one end, but which are entirely separate and distinct at every point except where they are welded together. Upon opposite edges of this inner welded end are formed the projections B, which catch in recesses C, formed in the inner side of the clamp D, through which the outer ends of the bands A pass. These bands are passed around the tire while upon the wheel, and three separate and distinct bands are used in preference to a single one, because the three are more flexible and can be more readily adjusted than a single one could, having the necessary strength. The free outer ends of these three bands pass through the clamp D, and can be adjusted freely back and forth through the clamps, so as to adapt them to the size of the wheel upon which the tire is to be shrunk. The clamp D is preferably of the shape shown, and has pivoted to it the link E, which is connected at its inner end to the block F; and to the outer side of this block F is pivoted a second link, G, which is pivoted at its outer end to a second clamp, H. To the outer end of each of the links E G is connected an arm, I, and these arms are pivoted at their upper ends to the nut J, through which the screw L passes. When the screw is turned in one direction, the nut J moves toward the block F and the links and arms I force the two clamps D H apart, and when the screw is turned in the opposite direction the nut J moves outward from the block F and the arms I draw the two clamps toward each other.

The second clamp, H, fits over the top of the inner end of the clamp D and has the three bands A to pass through it. Pivoted to this clamp H is a wedge, N, and pivoted to the outer end of this wedge is the lever O, which has its inner end formed into a loop, so as to pass around the bands and so as to catch in notches made in opposite sides of a second wedge, P, which is placed between two of the bands A. Passed around the journal or pivot upon which the lever O turns is a suitable spring for the purpose of causing the lever to return to position after having been moved and to force the second wedge P inward between the bands and toward the clamp H. When the outer end of the lever is moved toward the clamp H, the wedge P is forced outward, causing the three bands A to be clamped together and all three of the bands to be drawn outward through the two clamps D H, and thus tightened around the wheel. As long as the outer end of the lever O is moved toward the screw L, the wedge P and the lever serve to hold the bands so that they cannot possibly slip forward. If, while the bands are being thus held by the lever O, the screw L is operated so as to force the two clamps D H apart, the bands will be tightened around the wheel in such a manner as to shrink the tire without the necessity of removing it from the wheel. The bands being fastened to the clamp D at one end, and being fastened to the clamp H at the other end, by the lever O, when the two clamps are forced apart by the screw the bands are made to compress the tire while cold.

Placed inside of the clamp D is a flexible band or bearing, S, which is connected to the clamp D at its outer end by means of projections upon opposite sides which catch in recesses made in the outer edges of the clamp, and which is fastened at its other end to the inner end of the clamp by means of a nut and screw, as shown. Through opposite sides of this bearing S are formed openings or recesses T, and through these recesses T the inner cam edges of the lever U, pivoted in the clamp D, bear against the outer one of the bands for the purpose of clamping all three of them against the inner stationary end of the bands and thus prevent them from slipping backward through the clamp D while either the screw L is being adjusted to again operate the clamp H or while the lever O is being adjusted to take another hold upon the bands for the purpose of tightening them.

The three bands are held in contact with each other by means of suitable clamps, W, any number of which may be provided with supporting-legs for the purpose of raising the machine any suitable distance above the ground. Each one of the clamps is also provided with a leg, X, which assists in supporting the machine. The clamps have suitable supports, Y, formed upon their inner edges for the wheel to rest upon.

Having thus described my invention, I claim—

1. In a tire-shrinker, the combination of two or more flexible bands which are rigidly secured together at one end with suitable clamps, which are connected to the bands and by means of which the bands may be made to shrink a tire upon the wheel, substantially as shown.

2. The combination of two or more flexible bands with the two clamps D H, and a mechanism, substantially as shown, for forcing the two clamps apart, substantially as described.

3. The combination of the flexible bands, the clamp D, to which the bands are fastened at one end, and through which the free ends of the bands are passed, the second clamp H, provided with means for holding the bands and the links, the block or arm, the nut, and the screw for forcing the two clamps apart, substantially as set forth.

4. The combination of the clamps D H, the flexible bands A, mechanism, substantially as shown, for separating the two clamps, the wedges N P, and the lever O, substantially as specified.

5. The combination of the two clamps D H, and a mechanism for forcing them apart, wedges connected to the clamp H, the flexible bands, the flexible bearing S, connected to the clamp D, and the operating-lever U, substantially as shown.

6. The combination, with the clamps and the endless bands, of the clamps which are applied directly to the bands and provided with supporting-legs and bearing-surfaces for the wheel inside of the band, substantially as described.

In testimony whereof I affix my signature in presence of two witnesses.

WILLIAM M. PALMER.

Witnesses:
 JOSEPHINE DE PUY,
 WILBUR F. DE PUY.